(12) United States Patent
Derisavi et al.

(10) Patent No.: US 8,990,791 B2
(45) Date of Patent: Mar. 24, 2015

(54) INTRAPROCEDURAL PRIVATIZATION FOR SHARED ARRAY REFERENCES WITHIN PARTITIONED GLOBAL ADDRESS SPACE (PGAS) LANGUAGES

(75) Inventors: Salem Derisavi, Richmond Hill (CA); Ettore Tiotto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 13/194,889

(22) Filed: Jul. 29, 2011

(65) Prior Publication Data
US 2014/0115276 A1    Apr. 24, 2014

(51) Int. Cl.
*G06F 9/45* (2006.01)
(52) U.S. Cl.
CPC .................................. *G06F 8/4441* (2013.01)
USPC ............ 717/149; 717/151; 717/159; 717/160
(58) Field of Classification Search
None
See application file for complete search history.

(56) References Cited

U.S. PATENT DOCUMENTS

| | | | |
|---|---|---|---|
| 5,812,852 A * | 9/1998 | Poulsen et al. ................. | 717/149 |
| 7,062,762 B2 * | 6/2006 | Krishnamurthy et al. .... | 717/156 |
| 7,254,809 B2 * | 8/2007 | Kurhekar et al. ............. | 717/146 |
| 7,877,739 B2 * | 1/2011 | Archambault et al. ....... | 717/141 |
| 2004/0221281 A1* | 11/2004 | Suganuma .................... | 717/151 |

FOREIGN PATENT DOCUMENTS

| | | |
|---|---|---|
| EP | 1901165 A2 | 3/2008 |
| WO | 2010121228 A2 | 10/2010 |

OTHER PUBLICATIONS

Barton et al., Shared memory programming for large scale machines, Jun. 2006, ACM, in Proceedings of the 2006 ACM SIGPLAN conference on Programming language design and implementation (PLDI '06), pp. 108-117.*
Christopher Barton, et al., An Unified Parallel C Compiler that Implements Automatic Communication Coalescing, Article: 14th Workshop on Compilers for Parallel Computing, Jan. 2009, pp. 1-15 (plus 2 citation pages), Published on the World Wide Web.
Tarek A. El-Ghazawi, et al., Benchmarking Parallel Compilers: A UPC Case Study, Journal: Future Generation Computer Systems, Aug. 2006, pp. 1-14 (plus 1 citation page), vol. 22, Issue 7, Elsevier Science Publishers B. V., Amsterdam, The Netherlands.

(Continued)

*Primary Examiner* — Lewis A Bullock, Jr.
*Assistant Examiner* — Melissa Alfred
(74) *Attorney, Agent, or Firm* — Lee Law, PLLC; Christopher B. Lee

(57) ABSTRACT

Partitioned global address space (PGAS) programming language source code is retrieved by an executed PGAS compiler. At least one shared memory array access indexed by an affine expression that includes a distinct thread identifier that is constant and different for each of a group of program execution threads targeted to execute the PGAS source code is identified within the PGAS source code. It is determined whether the at least one shared memory array access results in a local shared memory access by all of the group of program execution threads for all references to the at least one shared memory array access during execution of a compiled executable of the PGAS source code. A direct memory access executable code is generated for each shared memory array access determined to result in the local shared memory access by all of the group of program execution threads.

15 Claims, 4 Drawing Sheets

(56) References Cited

OTHER PUBLICATIONS

Christopher M. Barton, Improving Access to Shared Data in a Partitioned Global Address Space Programming Model, Ph.D. Thesis, Spring 2009, pp. 1-203, University of Alberta Library, Edmonton, Alberta, Canada.

Christopher Barton, et al., Shared Memory Programming for Large Scale Machines, Proceedings: Conference on Programming Language Design and Implementation (PLDI), 2006, Jun. 11-14, 2006, pp. 1-10, Association for Computing Machinery (ACM), Published on the World Wide Web.

Mohamed Bakhouya, et al., Towards a Complexity Model for Design and Analysis of PGAS-Based Algorithms, Book chapter: Lecture Notes in Computer Science, High Performance Computing and Communications, Sep. 2007, pp. 672-682, vol. 4782, Springer-Verlag, Heidelberg, Germany.

Tarek El-Ghazawi, et al., UPC Distributed Shared Memory Programming, Book/manual, 2005, pp. i-252, John Wiley & Sons, Inc., Hoboken, New Jersey and Canada.

Wei-Yu Chen, et al., Communication Optimizations for Fine-grained UPC Applications, Proceedings: 14th International Conference on Parallel Architectures and Compilation Techniques, (PACT), Oct. 10, 2005, pp. 267-278 (plus 1 citation page), IEEE, Published on the World Wide Web.

Rajesh Nishtala, et al., Performance without Pain = Productivity: Data Layout and Collective Communication in UPC, Proceedings of the 2008 CM SIGPLAN Symposium on Principles and Practice of Parallel Programming, Feb. 2008, pp. 1-11, Association for Computing Machinery (ACM), Published on the World Wide Web.

Christopher Barton, et al., Multidimensional blocking in UPC, Proceedings of the 20th International Workshop on Languages and Compilers for Parallel Computing, Oct. 11-13, 2007, pp. 1-16 (plus 1 citation page), Association for Computing Machinery (ACM), also published in Book: Languages and Compilers for Parallel Computing, Springer-Verlag, Heidelberg, Germany.

Christopher Barton, et al., A Characterization of Shared Data Access Patterns in UPC Programs, Proceedings of the 19th International Workshop on Languages and Compilers for Parallel Computing, Nov. 2-4, 2006, pp. 1-16 (plus 1 citation page), Association for Computing Machinery (ACM), also published in Book: Languages and Compilers for Parallel Computing, Springer-Verlag, Heidelberg, Germany.

Tarek El-Ghazawi, et al., UPC Performance and Potential: A NPB Experimental Study, Proceedings: 2002 ACM/IEEE Conference on Supercomputing, Nov. 16, 2002, pp. 1-26 (plus 1 citation page), IEEE, Published on the World Wide Web.

Francois Cantonnet, et al., Fast Address Translation Techniques for Distributed Shared Memory Compilers, Proceedings. 19th IEEE International Symposium on Parallel and Distributed Processing, Apr. 4, 2005, pp. 1-11 (plus 1 citation page), IEEE, Published on the World Wide Web.

Weiming Zhao, et al., Scale UPC: A UPC Compiler for Multi-Core Systems, Technical Report, Michigan Technological University, Sep. 8, 2009, pp. 1-15 (plus 1 citation page), Association for Computing Machinery (ACM), New York, NY.

\* cited by examiner

INTRAPROCEDURAL PRIVATIZATION FOR SHARED ARRAY REFERENCES WITHIN PARTITIONED GLOBAL ADDRESS SPACE (PGAS) LANGUAGES

RELATED APPLICATIONS

This invention was made with Government support under contract number HR0011-07-9-0002 awarded by the PERCS Phase III Program of the Defense Advanced Research Projects Agency (DARPA) of the United States of America. The Government has certain rights to this invention.

BACKGROUND

The present invention relates to computer programming language compilers. More particularly, the present invention relates to intraprocedural privatization for shared array references within partitioned global address space (PGAS) languages.

Partitioned global address space (PGAS) programming languages offer a programming model for parallel programming PGAS languages, such as Unified Parallel C (UPC) and Co-Array Fortran, combine shared-memory programming with a message-passing paradigm within a parallel computing environment. Computing device clusters provide an example distributed parallel computing environment within which PGAS languages may be used.

BRIEF SUMMARY

A method includes retrieving, via an executed partitioned global address space (PGAS) programming language compiler, PGAS source code; identifying within the PGAS source code at least one shared memory array access indexed by an affine expression that comprises a distinct thread identifier that is constant and different for each of a plurality of program execution threads targeted to execute the PGAS source code; determining whether the at least one shared memory array access results in a local shared memory access by all of the plurality of program execution threads for all references to the at least one shared memory array access during execution of a compiled executable of the PGAS source code; and generating direct memory access executable code for each of the at least one shared memory array access determined to result in the local shared memory access by all of the plurality of program execution threads for all references to the at least one shared memory array access during the execution of the compiled executable of the PGAS source code.

A system includes a memory and a processor programmed to retrieve partitioned global address space (PGAS) programming language source code from the memory; identify within the PGAS source code at least one shared memory array access indexed by an affine expression that comprises a distinct thread identifier that is constant and different for each of a plurality of program execution threads targeted to execute the PGAS source code; determine whether the at least one shared memory array access results in a local shared memory access by all of the plurality of program execution threads for all references to the at least one shared memory array access during execution of a compiled executable of the PGAS source code; and generate direct memory access executable code for each of the at least one shared memory array access determined to result in the local shared memory access by all of the plurality of program execution threads for all references to the at least one shared memory array access during the execution of the compiled executable of the PGAS source code.

A computer program product includes a computer readable storage medium including computer readable program code, where the computer readable program code when executed on a computer causes the computer to retrieve partitioned global address space (PGAS) programming language source code; identify within the PGAS source code at least one shared memory array access indexed by an affine expression that comprises a distinct thread identifier that is constant and different for each of a plurality of program execution threads targeted to execute the PGAS source code; determine whether the at least one shared memory array access results in a local shared memory access by all of the plurality of program execution threads for all references to the at least one shared memory array access during execution of a compiled executable of the PGAS source code; and generate direct memory access executable code for each of the at least one shared memory array access determined to result in the local shared memory access by all of the plurality of program execution threads for all references to the at least one shared memory array access during the execution of the compiled executable of the PGAS source code.

DETAILED DESCRIPTION

Figure 1:
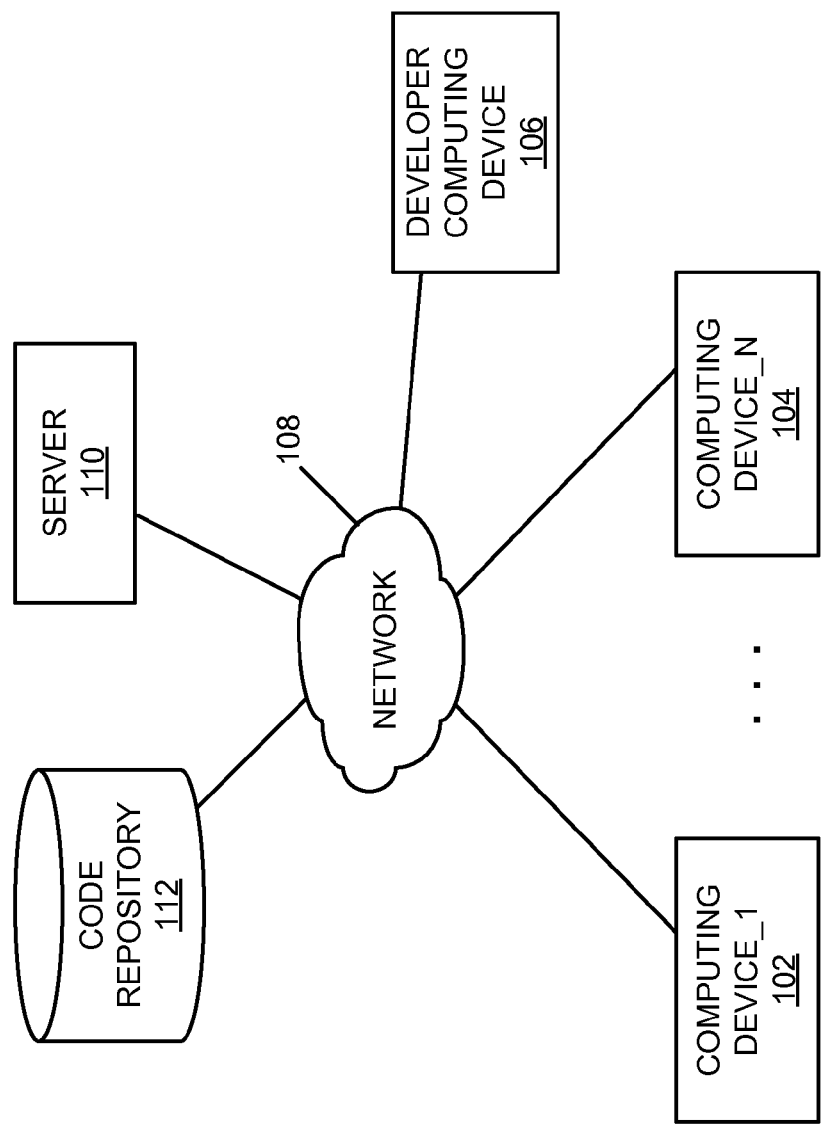
FIG. 1 is a block diagram of an example of an implementation of a system for automated intraprocedural privatization for shared array references within partitioned global address space (PGAS) languages according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated intraprocedural privatization for shared array references within partitioned global address space (PGAS) languages. The present subject matter operates to identify shared memory array accesses within PGAS source code that are indexed by an affine expression that includes a distinct thread identifier (e.g., "MYTHREAD") that is constant and different for each execution thread that is targeted to execute the PGAS source code. A determination is made for each shared memory array access as to whether the memory access results in a local shared memory access by all program execution threads for all references to the shared memory access during execution of the compiled executable of the PGAS source code. The determination is performed by evaluating two conditions that are independent of the thread identifier. Affirmative (i.e., true) results from the two conditions proves that the memory access is local for all threads without having to iteratively or recursively analyze all of the memory accesses for all possible array index values. A direct memory access (i.e., executable code) is generated for each shared array access determined to result in a shared local memory reference by all threads for all references to the shared memory access during execution of the compiled executable of the PGAS source code. As such, executable performance may be improved by the automated intraprocedural privatization for shared array references within partitioned global address space (PGAS) languages described herein.

For purposes of the present subject matter, the phrase "privatization" or "privatized" refers to the generation (during compilation) of a direct memory reference rather than creating a runtime call to access a shared array element. Further, a "candidate for privatization" refers to a memory access expression that may be determined to result into a shared local memory access for all threads that process the expression, rather than a shared remote memory access. A "thread" or a "program execution thread" may be considered an executable program segment that may operate concurrently with other similar program executable segments that may access shared resources.

It should be noted that conception of the present subject matter resulted from recognition of certain limitations associated with high-performance computing (HPC) applications on large-scale distributed memory machines and a recognized difficulty (and cost) of programming large-scale clusters when faced with the challenge of scaling up scientific applications to massively parallel hardware (e.g., petascale level today, but approaching exascale level within the foreseeable future). Additionally, it was recognized that programmer productivity is becoming a major factor in procurement decisions by many HPC customers. A new compiler optimization designed to recognize a class of commonly used array access patterns which are "privatizable" has been recognized and is described in detail herein. The present subject matter improves runtime performance and scalability of the compiled application by providing a platform for intraprocedural analysis and privatization for shared array references within PGAS languages, such as Unified Parallel C (UPC) and Co-Array Fortran (among others), as described above and in more detail below. For example, the present subject matter identifies local shared memory references for threads for all possible indexes into a shared array at compile time, and generates direct local references for those identified local shared memory references rather than generating runtime calls, which take longer to execute. As such, processing resources and time are not consumed by the execution of runtime calls when all possible array memory accesses for all threads for a particular source-code level shared array access are local accesses. Direct local accesses utilize fewer low-level instructions and, as such, execute more quickly. Accordingly, improved efficiency for memory accesses may be obtained through intraprocedural privatization for shared array references described herein.

The automated intraprocedural privatization for shared array references within partitioned global address space (PGAS) languages may be utilized to identify local memory accesses to shared arrays for all threads that will execute code that accesses the respective shared arrays. The subject matter described herein operates independent of (e.g., without) analysis of loop induction variables. As such, the present subject matter may be applied to shared array references regardless of whether they are inside a loop construct or outside of a loop construct. The present subject matter targets shared array references that are indexed by an affine expression of the "MYTHREAD" induction variable (e.g., a reference that represents a constant that is defined and that is different for each thread), and does not rely upon a loop induction variable. The present subject matter operates upon the recognition and analysis of shared array accesses with the objective of classifying such accesses into two sets. The first set includes local shared accesses and the second set includes remote shared accesses. The present subject matter performs this classification by analyzing candidate shared arrays for each array index where the index expression is an affine expression of the "MYTHREAD" identifier. Further, the present subject matter operates without intervention of and independent of (e.g., without) a code reduction operation. In contrast, algebraic properties of integer functions, such as "ceiling( )" and "floor( )," are used, which improves analysis and compilation for shared array accesses. It is further noted, that while the present subject matter targets shared array references that are indexed by an affine expression of the "MYTHREAD" identifier, the present subject matter operates to analyze shared array accesses without requiring an explicit calculation of the value assumed by the array index expression for each possible value of the "MYTHREAD" identifier. As such, efficiency may be further improved by reducing analysis time for shared array accesses by the use of algebraic manipulations rather than processing of complex data sets that represent the actual array accesses for all possible values of the array index expression for all threads.

The present subject matter may be applied to any PGAS language, such as Unified Parallel C (UPC) and Co-Array Fortran (among others), by application of the subject matter described herein as appropriate for the particular programming language. It should be noted that the examples provided herein utilize UPC pseudo syntax. However, it should be understood that the present subject matter may be applied to any PGAS language with only syntax-specific variations based upon the description herein.

In UPC, shared arrays are distributed across an entire global address space available/accessible to the compiled application. Unlike memory/array accesses within a message passing interface (MPI) programming model, a UPC thread has direct access to every element of a shared array. As such, any UPC thread may read (or write) any portion of a shared array by indexing the array element(s) just like one would do in a conventional C program. For example, the following first pseudo example syntax shows one possible example of a shared array access that may access an array that is distributed across multiple physical memory locations.

```
shared [BF] int ArrayName[N]; // shared array declaration
void foo(int k) {
    ArrayName[MYTHREAD+k] = MYTHREAD; // shared array
    access
}
```

As can be seen from the first pseudo example syntax above, "ArrayName" is defined as a "shared" array of "N" elements with a layout identifier (or block factor) of "BF." The block factor indicates that the shared memory associated with the array will be allocated in blocks of "BF" consecutive array elements per thread. Given "T" threads and "M" nodes, "T/M" (T divided by M) threads may be targeted to run on the same physical device/node. Within the function "foo," the shared array reference "ArrayName[MYTHREAD+k]" is executed by all threads in a single program multiple data (SPMD) fashion. The array reference performed by any given thread "T" may access shared memory located on the same physical device/node "M" where that thread "T" executes/runs, or may access shared memory located in any other node, depending on the value of the array index expression "MYTHREAD+k."

The latency of a shared array access depends upon whether the accessed memory is located in the local physical address space associated with the thread performing the memory reference or whether the accessed memory is located in the remote physical address space of another device/node in a cluster. More formally, a shared array access performed by a thread "T" may be considered a "shared local" array/memory access with respect to thread "T" if the memory location associated with the access is physically located on the device/node where the thread "T" executes/runs. Conversely, a "shared remote" array/memory access with respect to thread "T" may be considered an access to memory that is physically located on a cluster device/node other than the one where the thread "T" executes/runs.

As such, a shared remote access to a remote memory location requires the UPC runtime executable to access the referenced remote memory content/data via network communication. Given that shared array accesses may potentially require network communication, previous compilers routinely translate shared array accesses into runtime calls, which may result into network communication. The present subject matter improves compiler technology by identifying which shared array accesses/references are local to the thread that is issuing the shared array accesses. Any shared array accesses/references indentified to be local shared accesses are converted to direct memory references to bypass runtime calls and therefore eliminate the runtime call overhead (e.g., processing of module and divide operations, latency, etc.).

The present subject matter analyzes shared array references where the index is an affine (i.e., linear) expression of the predefined UPC thread identifier (e.g., "MYTHREAD"). The present subject matter determines whether the access is a shared local access for all values of "MYTHREAD." If it is proven to be true that the access is a shared local access for all values of "MYTHREAD," the access is translated into a direct access by computing the linearized index into the local portion of the share array.

The following second example pseudo syntax provides additional details. The line number information (in parenthesis) is provided for ease of reference and description.

```
(Line 1) #define BF 15
(Line 2) shared [BF] struct S {
(Line 3)     int i;
(Line 4)     int b[10][10];
(Line 5) } A[1000];
(Line 6) void func(shared int* p) {
(Line 7)     int i;
(Line 8)     A[BF*MYTHREAD+14].b[2][3] = i; // shared local access (pattern 1)
(Line 9)     A[10*MYTHREAD+5].b[2][3] = i; // shared local access (pattern 2)
(Line 10)    A[20*MYTHREAD+5].b[2][3] = i; // shared local access (pattern 3)
(Line 11)    A[30*MYTHREAD+5].b[2][3] = i; // shared remote access
(Line 12)    upc_barrier;
(Line 13)    upc_forall (i=0; i < THREADS; i++; &p[i]) {
(Line 14)      A[BF*MYTHREAD+14].b[2][3] = i; // shared local access (pattern 1)
(Line 15)      A[10*MYTHREAD+5].b[2][3] = i; // shared local access (pattern 2)
(Line 16)      A[20*MYTHREAD+5].b[2][3] = i; // shared local access (pattern 3)
(Line 17)      A[30*MYTHREAD+5].b[2][3] = i; // shared remote access
(Line 18)    }
(Line 19) }
```

As can be seen from the second example pseudo syntax above, "Line 1" defines a block factor "BF" of fifteen (15), which as described above, is the number of sequential elements to be allocated within each array for each thread. Beginning at "Line 2," a shared array "A" (named in Line 5) with one thousand (1000) elements is declared with the block factor "BF." Each array element is a structure "struct S." "Line 3" and "Line 4" declare two members of each structure: an integer variable "i" and a two-dimensional array of type integer name "b." Using the "BF" definition, the first block of "BF" array elements of the array "A" will be allocated with affinity to thread zero (0), the second block of "BF" array elements of the array "A" will have affinity to thread one (1), etc. It should be noted that the example may be implemented/executed using multiple threads per device/node.

An example "func" routine begins in "Line 6" and receives a shared integer parameter "p" as input. As described below with respect to the loop construct that begins in "Line 13," the shared input parameter operates as an "affinity" operator. It is understood that each thread executes the "func" routine and that all threads execute every statement of the "func" routine concurrently. A synchronization statement "upc_barrier" at "Line 12" causes each thread to wait until all other threads complete the execution of the program up to that point.

"Line 7" defines a local integer variable "i." Beginning with "Line 8" through "Line 11," a sequence of elements of the two-dimensional array named "b" within the array "A" are assigned the value "i" at an offset identified via an affine (i.e., linear) expression of the "MYTHREAD" identifier. The "MYTHREAD" identifier is an integer variable that assumes values from zero (0) up to the number of threads minus one (THREADS-1) in the present example. However, it is noted that other forms of indexing are possible and all such indexing possibilities are considered within the scope of the present subject matter.

For the thread with a "MYTHREAD" value of zero (0), the expression within "Line 8" evaluates to a value that represents an index into the "A" array of fourteen (e.g., 15*0+14=14 which implies A[14]). For the thread with a "MYTHREAD" value of one (1), the expression within "Line 8" evaluates to a value that represents an index into the "A" array of twenty nine (e.g., 15*1+14=29, which implies A[29]). Similar analysis may be performed for determining the indexes into the array "A" executed at "Line 8" for all threads and for the remaining expressions within "Line 9" through "Line 11."

The "upc_barrier" synchronization statement represents a function call to the runtime system, and is a standard library routine in the UPC language. All threads stop to synchronize at the barrier.

A worksharing loop begins within "Line 13" with the syntax "upc_forall ( )." This loop construct is similar to a "for" loop within the "C" programming language within the addition of a fourth expression ("&p[i]" which is known as an "affinity" expression) within the parenthetical loop control syntax. The affinity expression determines which thread executes a particular loop iteration. The "upc_forall ( )" loop is a work sharing loop construct, such that if there are four threads (for example) and a million loop iterations, then each of the four threads would perform a subset of the total number of iterations (e.g., two hundred and fifty thousand—250,000 within this example). Each thread is assigned certain iterations of the loop via the affinity expression. As such, the particular thread "with affinity" to the affinity expression executes that particular loop iteration.

It can also be seen by the ampersand (&) address operator that the affinity expression used in this example is an address-based affinity expression. It is understood that other forms of affinity expressions exist, and that the present example is provided for purposes of describing the present subject matter.

As with "Line 8" through "Line 11," "Line 14" through "Line 17" encode a set of assignment operations for the shared array "A." Each assignment expression is based upon the value of the "MYTHREAD" identifier associated with each thread. "Line 18" ends the "upc_forall ( )" loop, while "Line 19" ends the "func" routine.

As can be seen from the second example pseudo syntax above, within "Line 8" through "Line 10" and within "Line 14" through "Line 16," the source comments indicate that the evaluated assignment results in a shared local access. As such, for purposes of the present example, the shared array element accesses are shared local accesses with respect to any thread (e.g., 0≤MYTHREAD<THREADS) and may therefore be safely privatized. However, the comment sections of "Line 11" and "Line 17" indicate that a shared remote access results. As such, for purposes of the present example, the array accesses at "Line 11" and "Line 17" are shared remote accesses for at least one of the possible values of "MYTHREAD" and are not candidates to be privatized.

The present subject matter provides an analytical tool for evaluating array accesses to determine whether they are shared local accesses for all threads or whether they may result in a shared remote access for at least one thread. The following third example pseudo syntax provides an example of a generic shared array access that may be processed according to the present subject matter to determine whether all accesses by all threads are shared local accesses or whether the expression may result in a shared remote access for at least one thread.

shared [$BF$] int $A[N]$;

$A[k1*MYTHREAD+k2]$

As with the previous examples, the blocking factor "BF" specifies the number of consecutive "shared" array elements for an integer array "A" with "N" elements that are allocated with affinity to each thread. The expression "$A[k1*MYTHREAD+k2]$" may be evaluated and processed (executed) by each thread. As such, this expression may be analyzed to determine whether it is a candidate for privatization.

To be considered a candidate for privatization, the present subject matter provides technology with which to prove, for any given access by any thread, whether the memory access is local to the thread. It is assumed for purposes of the present example, that the values "k1," "k2," and "BF" are integer values/constants, where "BF" is positive, and "k1" is non-negative.

The shared access may be proven to be a local access if the following equalities are satisfied for all possible values of "MYTHREAD" (i.e., from zero (0) to the number of threads minus one (THREADS-1)). The following Equation [A] represents the expression with which to prove whether the access is a local access for all possible values of "MYTHREAD."

$$\text{floor}((k1*MYTHREAD+k2)/BF)\% \text{THREADS}=\text{MYTHREAD} \quad [A]$$

With respect to Equation [A], it should be noted that the value of "BF" must be greater than zero (BF>0) and the number of threads, "THREADS" must be greater than or equal to two (THREADS≥2). It should also be noted that where there is only one thread (THREADS=1), all access will be local and evaluation of the expression would be superfluous.

Equation [A] uses the "floor" function. The floor function returns the largest integer not greater than the input expression (e.g., ("k1*MYTHREAD+k2)/BF"). As such, use of the floor function returns the section of the array. The remainder is returned by the division operation. The result of the division operation is compared using the equality operator (e.g., "=") to determine whether the current thread has affinity to the respective access. The "*" symbol represents a multiplication operator, the "/" symbol represents a division operator, and the "%" symbol represents a remainder operation.

With Equation [A] as a foundation, it should be noted that, to prove that a particular complex array access is valid for all values of "MYTHREAD," it is sufficient to show that two conditions are satisfied (e.g., true), as represented by the following equations referred to herein as Condition [1] and Condition [2].

$$\text{floor}(k2/BF)=\text{floor}(k2/(BF*\text{THREADS}))*\text{THREADS} \quad [1]$$

$$\text{floor}((k1*(\text{THREADS}-1)+k2\%BF)/BF)=\text{THREADS}-1 \quad [2]$$

It may be proven that the correctness of Equation [A] is valid for all values of "MYTHREAD" if Condition [1] and Condition [2] are valid. It should be noted that a difference between Condition [1] and Condition [2] relative to Equation [A] is that Condition [1] and Condition [2] are independent of "MYTHREAD," and reference other parameters as described above. Further, processing of Condition [1] and Condition [2] may be performed by a compiler at compile time because all values represented within Condition [1] and Condition [2] are known at compile time. As such, the two conditions, Condition [1] and Condition [2], may be evaluated once for any complex array access expression and the compiler may know with certainty whether the respective expression is privatizable for all values of "MYTHREAD" (e.g., for all accesses by all threads).

It should be noted, that while the present examples utilize array accesses for purposes of description, other forms of accesses may be processed similarly to those described within the present examples, and all such forms of accesses are considered within the scope of the present subject matter. For example, the following fourth example pseudo syntax represents one such application, shared [BF]int*p=&A[0];

p[k1*MYTHREAD+k2]=3;

The fourth example pseudo syntax represents an indexed expression with a base symbol as a pointer to a shared array. The analysis in this case would be identical whether the shared access is a shared array access or an access to a shared array performed via pointer to it. As noted above, other possibilities exist for implementation of the present subject matter and all such possibilities are considered within the scope of the present subject matter.

The following Proof illustrates that checking the two conditions, Condition [1] and Condition [2], is all that has to be performed to verify that a particular complex array access is valid for privatization for all values of "MYTHREAD." The following Proof shows that Equation [A] is equivalent to Condition [1] and Condition [2], and that as such, evaluation of Condition [1] and Condition [2] may be performed once for any particular complex array access rather than having to evaluate Equation [A] for every possible value of "MYTHREAD" (e.g., a million times or more for certain implementations). It is understood that the following mathematical Proof is self documenting mathematically and that it is described via the mathematics shown below with moderate text description for brevity, and that no additional description other than that provided below is necessary for a person of skill to utilize the subject matter described within the teachings herein.

The Proof begins with Lemma (1):

Lemma (1): Given integer a and positive integers b and c, we have $\lfloor a/bc \rfloor = \lfloor \lfloor a/b \rfloor /c \rfloor$.

Let $a=bck+r$ in which k is an integer and $0 \leq r < bc$. We have $\lfloor a/bc \rfloor = k$.

Moreover, $\lfloor a/b \rfloor = \lfloor (bck+r)/b \rfloor = ck + \lfloor r/b \rfloor$. On the other hand, $0 \leq r < bc \Rightarrow 0 \leq r/b < c$ $\Rightarrow 0 \leq \lfloor r/b \rfloor \leq c-1$ $\Rightarrow ck \leq ck + \lfloor r/b \rfloor \leq ck+c-1$ $\Rightarrow ck \leq \lfloor a/b \rfloor \leq ck+c-1$ $\Rightarrow k \leq \lfloor a/b \rfloor /c \leq k+1-1/c < k+1$ $\Rightarrow \lfloor \lfloor a/b \rfloor /c \rfloor = k = \lfloor a/bc \rfloor$ The Proof continues with Lemma (2):

Lemma (2): Let m, m', n be integers such that n>0 and m≥m'. $\lfloor m/n \rfloor = \lfloor m'/n \rfloor$ holds if and only if $m-m' < n-m' \% n$.

Let k, k', r, and, r' be integers such that m'=nk'+r', m=nk+r, $0 \leq r < n$, and, $0 \leq r' < n$. Note that $k=\lfloor m/n \rfloor$, $k'=\lfloor m'/n \rfloor$, r=m % n, and, r'=m' % n. Moreover, since m≥m', then k≥k'.

if part: We have:

$m-m' < n-m' \% n \Rightarrow nk+r-(nk'+r') < n-r'$ $\Rightarrow n(k-k'-1) < -r$ $\Rightarrow r < n(k'+1-k)$ $\Rightarrow 0 \leq n(k'+1-k)$ since r≥0

$\Rightarrow 0 < k'+1-k$ since n>0

$\Rightarrow k \leq k'$ $\Rightarrow k=k'$ since k≥k' only if part: We have:

$\lfloor m/n \rfloor = \lfloor m'/n \rfloor \Rightarrow k=k'$ $\Rightarrow m-m'=nk+r-nk'-r'=r-r' < n-r'=n-m' \% n$ The Proof continues with Lemma (3):

Lemma (3): Given integers m, m', n, k, k' such that k, k'≥0, n>0, and kn≤m'≤k'n, we have $$k \leq \left\lfloor \frac{m+m'}{n} \right\rfloor - \left\lfloor \frac{m}{n} \right\rfloor \leq k'.$$

Let j and r be integers such that m=nj+r and $0 \leq r < n$. Note that j=⌊m/n⌋. We have:

$$\left\lfloor \frac{m+m'}{n} \right\rfloor - \left\lfloor \frac{m}{n} \right\rfloor = \left\lfloor \frac{nj+r+m'}{n} \right\rfloor - \left\lfloor \frac{nj+r}{n} \right\rfloor$$

$$= j + \left\lfloor \frac{r+m'}{n} \right\rfloor - j$$

$$= \left\lfloor \frac{r+m'}{n} \right\rfloor$$

Moreover, since $0 \leq r < n$ and kn≤m'≤k'n, we have kn≤r+m'<(k'+1)n. Therefore, k≤(r+m')/n<k'+1, and finally, $$k \leq \left\lfloor \frac{r+m'}{n} \right\rfloor \leq k'.$$

In the rest of this Proof, "MYTHREAD," "THREADS," and "BF" are replaced with variable notation "i," "N," and "B," respectively, to make the notation more concise. It is assumed that "B" is greater than zero and that "N" is greater than or equal to two (i.e., B>0 and N≥2). It is additionally noted that if "N" equals one (i.e., N=1), all accesses will be local.

The following represents Theorem (1):

Theorem (1): Given integers $k_1 \geq 0$, N≥2, B>0, and $k_2$, Eq. (1) below holds for all i (0≤i<N)

$$\left\lfloor \frac{k_1 i + k_2}{B} \right\rfloor \% N = i \tag{1}$$

if the following two conditions are satisfied:

$$\lfloor k_2 / B \rfloor = N \lfloor k_2 / BN \rfloor \tag{2}$$

$$\left\lfloor \frac{k_1(N-1) + k_2 \% B}{B} \right\rfloor = N - 1 \tag{3}$$

For arbitrary integers a and b, $a \% b = a - b\lfloor a/b \rfloor$.
Therefore, using the above equality and Lemma (1),
left hand side of Eq. (1)=

$$\left\lfloor \frac{k_1 i + k_2}{B} \right\rfloor - N \left\lfloor \frac{\left\lfloor \frac{k_1 i + k_2}{B} \right\rfloor}{N} \right\rfloor = \left\lfloor \frac{k_1 i + k_2}{B} \right\rfloor - N \left\lfloor \frac{k_1 i + k_2}{BN} \right\rfloor.$$

Therefore to prove Eq. (1), we can equivalently prove Eq. (4) below:

$$\left\lfloor \frac{k_1 i + k_2}{B} \right\rfloor - N \left\lfloor \frac{k_1 i + k_2}{BN} \right\rfloor = i \text{ for all possible values of } i \quad (4)$$

Moreover, Eq. (4) holds if and only if the following two equations hold:

$$\left\lfloor \frac{k_2}{B} \right\rfloor - N \left\lfloor \frac{k_2}{BN} \right\rfloor = 0 \quad (5)$$

(Eq. (4) at $i = 0$)

(Subtracting Eq. (4) at i and i−1 for $1 \leq i < N$)

$$\left\lfloor \frac{k_1 i + k_2}{B} \right\rfloor - N \left\lfloor \frac{k_1 i + k_2}{BN} \right\rfloor - \left( \left\lfloor \frac{k_1 (i-1) + k_2}{B} \right\rfloor - N \left\lfloor \frac{k_1 (i-1) + k_2}{BN} \right\rfloor \right) = \quad (6)$$

$$i - (i-1) = 1 \Rightarrow \underbrace{\left\lfloor \frac{k_1 i + k_2}{B} \right\rfloor - \left\lfloor \frac{k_1 (i-1) + k_2}{B} \right\rfloor}_{x(i)} -$$

$$\underbrace{\left( N \left\lfloor \frac{k_1 i + k_2}{BN} \right\rfloor - N \left\lfloor \frac{k_1 (i-1) + k_2}{BN} \right\rfloor \right)}_{y(i)} = 1$$

Eq. (5) is the same as Eq. (2). So we only need to prove Eq. (6) if Eqs. (2) and (3) are satisfied. To do that we first prove $y(i) = 0$, and then, $x(i) = 1$ for all possible values of i.

First, note that using Eq. (2), we have:

$$k_2 \% B = k_2 - \lfloor k_2/B \rfloor B = k_2 - BN \lfloor k_2/BN \rfloor = k_2 \% BN.$$

Eq. (3) then implies:

$$0 < \frac{k_1(N-1) + k_2 \% B}{B} < N \Rightarrow 0 < k_1(N-1) + k_2 \% B < BN$$

$$\Rightarrow 0 < k_1(N-1) + k_2 \% BN < BN \text{ since } k_2 \% B = k_2 \% BN$$

$$\Rightarrow 0 < k_1(N-1) + k_2 - BN \lfloor k_2 / BN \rfloor < BN$$

$$\Rightarrow 0 < \frac{k_1(N-1) + k_2}{BN} - \lfloor k_2 / BN \rfloor < 1 \text{ dividing by } BN$$

$$\Rightarrow \lfloor k_2 / BN \rfloor < \frac{k_1(N-1) + k_2}{BN} < 1 + \lfloor k_2 / BN \rfloor$$

$$\Rightarrow \left\lfloor \frac{k_2}{BN} \right\rfloor = \left\lfloor \frac{k_1(N-1) + k_2}{BN} \right\rfloor$$

$k_1(N-1) + k_2$ is larger than $k_2$, therefore, for any integer j such that $k_2 \leq j \leq k_1(N-1) + k_2$, we have $$\left\lfloor \frac{k_2}{BN} \right\rfloor = \left\lfloor \frac{k_1(N-1) + k_2}{BN} \right\rfloor = \left\lfloor \frac{j}{BN} \right\rfloor.$$

In particular, $$\left\lfloor \frac{k_1 i + k_2}{BN} \right\rfloor = \left\lfloor \frac{k_2}{BN} \right\rfloor \text{ for all } i \in \{0, \ldots, N-1\} \quad (7)$$

$$\Rightarrow \left\lfloor \frac{k_1 i + k_2}{BN} \right\rfloor = \left\lfloor \frac{k_1 (i-1) + k_2}{BN} \right\rfloor \text{ for all } i \in \{1, \ldots, N-1\}$$

(Rewriting Eq. (7) for i and i−1)

$$\Rightarrow N \left\lfloor \frac{k_1 i + k_2}{BN} \right\rfloor = N \left\lfloor \frac{k_1 (i-1) + k_2}{BN} \right\rfloor \text{ for all } i \in \{1, \ldots, N-1\}$$

$$\Rightarrow y(i) = 0 \text{ for all } i \in \{1, \ldots, N-1\}$$

Now we will prove that $x(i) = 0$ for $i \in \{1, \ldots, N-1\}$.
Starting from Eq. (3), $$\left\lfloor \frac{k_1(N-1) + k_2 \% B}{B} \right\rfloor = N - 1 \Rightarrow \left\lfloor \frac{k_1(N-1) + k_2 - B \lfloor \frac{k_2}{B} \rfloor}{B} \right\rfloor = N - 1 \quad (8)$$

$$\Rightarrow \left\lfloor \frac{k_1(N-1) + k_2}{B} \right\rfloor - \left\lfloor \frac{k_2}{B} \right\rfloor = N - 1$$

$$\Rightarrow \sum_{i=1}^{N-1} \left( \left\lfloor \frac{k_1 i + k_2}{B} \right\rfloor - \left\lfloor \frac{k_1 (i-1) + k_2}{B} \right\rfloor \right) = N - 1$$

Note that Eq. (3) implies $k_1 < 2B$ because otherwise (i.e., if $k_1 \geq 2B$), then $$\left\lfloor \frac{k_1(N-1) + k_2 \% B}{B} \right\rfloor \geq \left\lfloor \frac{2B(N-1) + k_2 \% B}{B} \right\rfloor \geq$$

$$2(N-1) + \left\lfloor \frac{k_2 \% B}{B} \right\rfloor \geq 2(N-1) > N - 1$$

and that would contradict Eq. (3).
We now consider two cases:
The first case is:
$0 < k_1 \leq B$: In this case, according to Lemma (3) (n'=$k_1$, k=0, k'=1, n=B, m=$k_1(i-1) + k_2$), we have:

$$\left\lfloor \frac{k_1 i + k_2}{B} \right\rfloor - \left\lfloor \frac{k_1 (i-1) + k_2}{B} \right\rfloor \leq 1 \text{ for all } i \in \{1, \ldots, N-1\} \quad (9)$$

For both Eqs. (8) and (9) to be satisfied, we must have $$\left\lfloor \frac{k_1 i + k_2}{B} \right\rfloor - \left\lfloor \frac{k_1 (i-1) + k_2}{B} \right\rfloor = 1,$$

that is, $x(i) = 1$ for all $i \in \{1, \ldots, N-1\}$.

The second case is:

$B < k_1 < 2B$: In this case, according to Lemma (3) ($n'=k_1$, $k=1$, $k'=2$, $n=B$, $m=k_1(i-1)+k_2$), we have:

$$\left\lfloor 1 \le \frac{k_1 i + k_2}{B} \right\rfloor - \left\lfloor \frac{k_1(i-1) + k_2}{B} \right\rfloor \le 2 \text{ for all } i \in \{1, \ldots, N-1\} \quad (10)$$

For both Eqs. (8) and (10) to be satisfied, we must have:

$$\left\lfloor \frac{k_1 i + k_2}{B} \right\rfloor - \left\lfloor \frac{k_1(i-1) + k_2}{B} \right\rfloor = 1,$$

that is, $x(i)=1$ for all $i \in \{1, \ldots, N-1\}$.

The above Proof shows that checking the two conditions, Condition [1] and Condition [2], is all that has to be performed to verify that a particular complex array access is valid for privatization for all values of "MYTHREAD." With this mathematical underpinning described, example implementations of the present subject matter will be described below.

The automated intraprocedural privatization for shared array references within partitioned global address space (PGAS) languages described herein may be performed in real time to allow prompt recognition of local memory accesses under all thread operating conditions and generation of in-line executable syntax rather than runtime calls. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated intraprocedural privatization for shared array references within partitioned global address space (PGAS) languages. A computing device_1 102 through a computing device_N 104, and a developer computing device 106 each communicate via a network 108 with a server 110 and access PGAS language encoded programming, such as Unified Parallel C (UPC) and Co-Array Fortran (among others) encoded programming, within a code repository 112.

The developer computing device 106 may be used by a program developer to create, edit, debug, and otherwise prepare PGAS code for distribution to computing devices, such as the computing device_1 102 through the computing device_N 104. The developer computing device 106 and/or the server 110 may operate a PGAS compiler to compile code for use within a partitioned global address space available within the system 100. Within the present example, it is assumed that the PGAS compiler is a UPC compiler configured as described herein to provide automated intraprocedural privatization for shared array references.

The computing device_1 102 through the computing device_N 104 and the server 110 each represent computing devices that may host and execute one or more threads within the system 100. Any of the computing device_1 102 through the computing device_N 104 and the server 110 may additionally host private and global address space for use within the present example system 100. It should be noted that the developer computing device 106 may additionally host threads and private/global address space without departure from the scope of the present subject matter.

As will be described in more detail below in association with FIG. 2 through FIG. 4, both the developer computing device 106 and the server 110 provide automated intraprocedural privatization for shared array references within partitioned global address space (PGAS) languages, as appropriate for a given implementation. The automated intraprocedural privatization for shared array references within partitioned global address space (PGAS) languages is based upon analysis of developed code for address accesses by threads and identification of access code segments that may be privatizable. Privatizable code sections are identified during compile time and generate direct memory references that bypass runtime call overhead (e.g., processing of expensive module and divide operations, latency, etc.). For any code sections/accesses that may not be privatized, runtime calls may be generated to access the respective remote memory locations relative to the execution location of the particular thread.

It should be noted that each of the respective computing devices may be a portable computing device, either by a user's ability to move the computing device to different locations, or by the computing device's association with a portable platform, such as a plane, train, automobile, or other moving vehicle. It should also be noted that the computing devices may be any computing device capable of processing information as described above and in more detail below. For example, the computing devices may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 110 may include any device capable of providing program code and data for execution and consumption, respectively, by a device, such as the computing device_1 102 through the computing device_N 104 and the developer computing device 106, via a network, such as the network 108. As such, the server 110 may include an application server, a web server, or other data server device.

Figure 2:
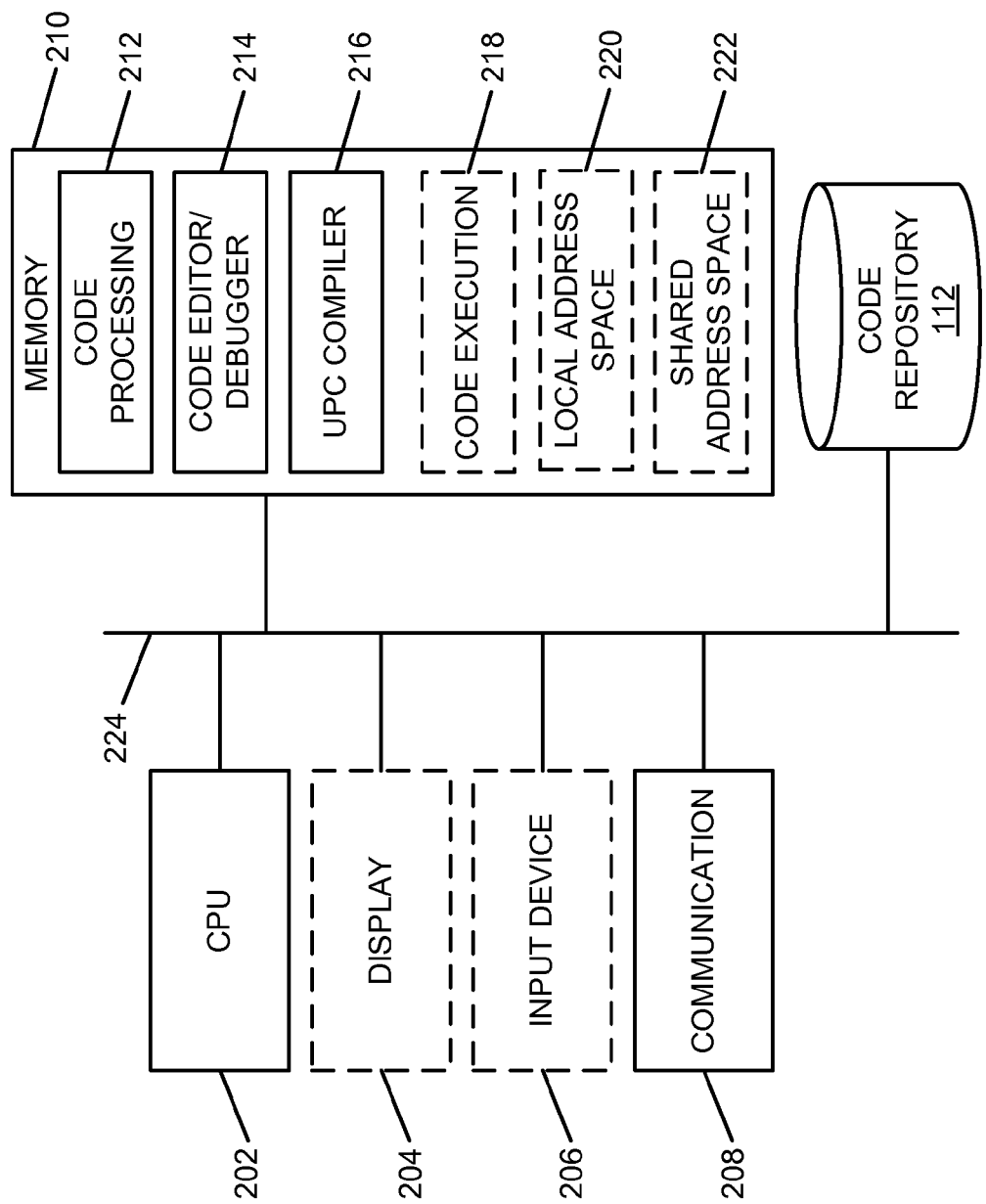
FIG. 2 is a block diagram of an example of an implementation of a core processing module capable of performing automated intraprocedural privatization for shared array references within partitioned global address space (PGAS) languages according to an embodiment of the present subject matter.

FIG. 2 is a block diagram of an example of an implementation of a core processing module 200 capable of performing automated intraprocedural privatization for shared array references within partitioned global address space (PGAS) languages. Within the present example, the core processing module 200 may be associated with either the developer computing device 106 or the server 110, as appropriate for a given implementation. Further, the core processing module 200 may provide different and complementary processing for privatization of partitioned global address space based upon which device the core processing module 200 is associated and with respect to the particular implementation. For example, the core processing module 200 may be implemented in association with the developer computing device 106 for code generation, while the core processing module 200 may be associated with the server for code compilation. Regardless of the particular implementation, the core processing module 200 performs the automated intraprocedural privatization for shared array references within partitioned global address space (PGAS) languages described herein.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, where the core processing module 200 is implemented in association with the server 110 and controlled via another core processing module 200 of the developer computing device 106, a display and input device may not be needed in association with the server 110. Alternatively, where the server 110 is accessible via a user for processing to configure, initiate, or otherwise manage or provision any of the computing device_1 102 through the computing device_N 106, the server 110 may have a display and input device. Accordingly, the core processing module 200 may operate as a completely automated embedded device without direct user configurability or feedback, but may also provide user feedback and configurability via the display 204 and the input device 206, respectively, as appropriate for the given implementation.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a code processing storage area 212 that stores computer code that is being edited and/or compiled, as well as compilation processing or other data within the core processing module 200. A code editor/debugger 214 is executable by the CPU 202 to edit and debug code. A UPC compiler 216 is also executable by the CPU 202 to compile UPC code within the present example. The UPC compiler 216 implements that automated intraprocedural privatization for shared array references within partitioned global address space (PGAS) languages described herein.

A code execution area 218, a local address space area 220, and a shared address space area 222 respectively represent execution space for UPC code, storage space for local memory accesses by one or more threads executed by the core processing module 200, and storage space for shared remote memory accesses by one or more threads executed by a different computing device. The code execution area 218, the local address space area 220, and a shared address space area 222 are illustrated with dashed-line representations to show that they are optional for any particular implementation of the core processing module 200. For example, in certain implementations, the server 110 may not implement the code execution area 218, the local address space area 220, and the shared address space area 222. However, in alternative implementations, the developer computing device 106 and the server 110 may be configured to implement functionality to host one or more threads and utilize these memory areas.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include one or more code storage areas, operating system storage areas, code execution areas, and data areas without departure from the scope of the present subject matter.

It should be noted that, while the UPC compiler 216 is shown as an executable program within the memory 210, the UPC compiler 216 may be implemented in a hardware or combined hardware implementation, as described below. For such a separate implementation, the UPC compiler 216 may be implemented as a component-level module and may include any hardware, programmed processor(s), and memory used to carry out the functions of this module as described above and in more detail below. For example, the UPC compiler 216 as implemented within such a separate module may include additional controller circuitry in the form of application specific integrated circuits (ASICs), processors, and/or discrete integrated circuits and components for performing communication and electrical control activities associated with the respective devices. Additionally, the UPC compiler 216 as implemented within such a separate module may include interrupt-level, stack-level, and application-level modules as appropriate. Furthermore, the UPC compiler 216 as implemented within such a separate module may include any memory components used for storage, execution, and data processing for performing processing activities associated with the module.

It should also be noted that the UPC compiler 216 as implemented within such a separate module may form a portion of other circuitry described without departure from the scope of the present subject matter. Further, as described above, the UPC compiler 216 as implemented within such a separate module may alternatively be implemented as an application stored within the memory 210. In such an implementation, the UPC compiler 216 may include instructions executed by the CPU 202 for performing the functionality described herein. The CPU 202 may execute these instructions to provide the processing capabilities described above and in more detail below for the core processing module 200.

The code repository 112 is also shown associated with the core processing module 200 to illustrate that the code repository 112 may form a portion of the core processing module 200 without utilizing network connectivity to access the code repository 112.

The CPU 202, the display 204, the input device 206, the communication module 208, the memory 210, and the code repository 112 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the code repository 112 is illustrated as a separate module, the code repository 112 may also be stored within the memory 210 without departure from the scope of the present subject matter. Accordingly, the core processing module 200 may take many forms and may be associated with many platforms.

Figure 3:
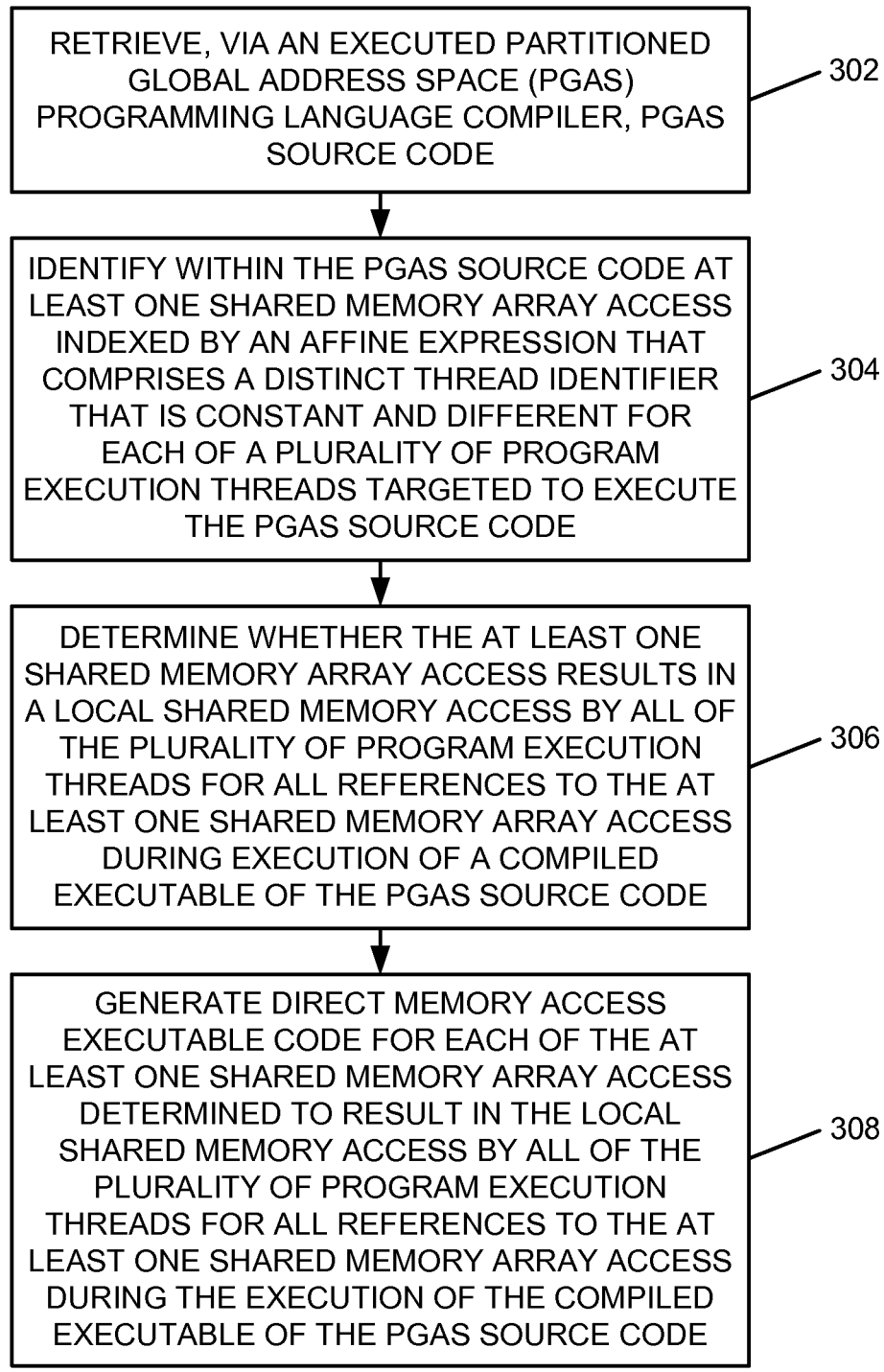
FIG. 3 is a flow chart of an example of an implementation of a process for automated intraprocedural privatization for shared array references within partitioned global address space (PGAS) languages according to an embodiment of the present subject matter.
Figure 4:
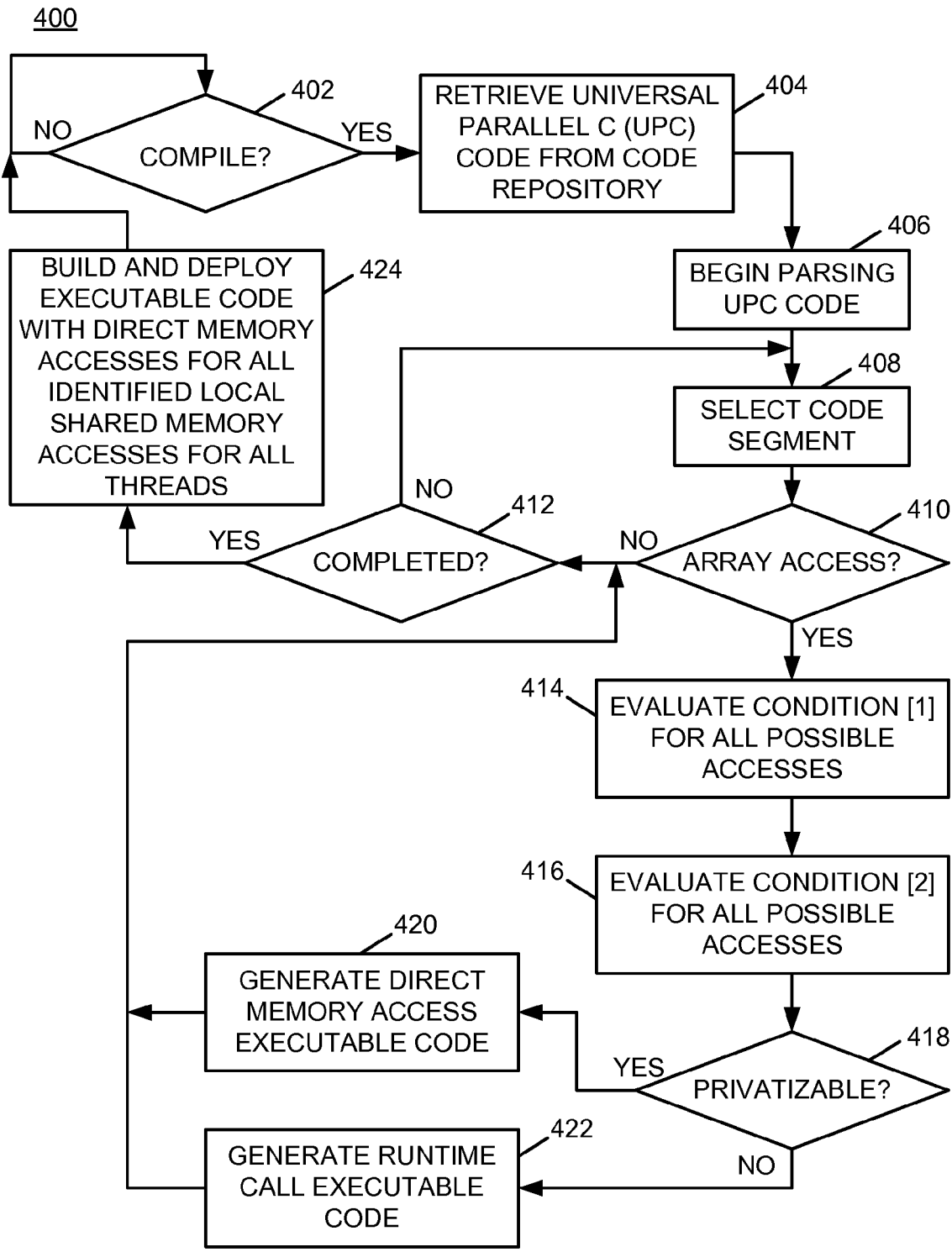
FIG. 4 is a flow chart of an example of an implementation of a process for automated intraprocedural privatization for shared array references within Unified Parallel C (UPC) code according to an embodiment of the present subject matter.

FIG. 3 through FIG. 4 below describe example processes that may be executed by devices, such as the core processing module 200, to perform the automated intraprocedural privatization for shared array references within partitioned global address space (PGAS) languages associated with the present subject matter. Many other variations on the example processes are possible and all are considered within the scope of the present subject matter. The example processes may be performed by modules, such as the UPC compiler 216, either as an application executed by the CPU 202 or as a stand-alone module, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated intraprocedural privatization for shared array references within partitioned global address space (PGAS) languages. At block 302, the process 300 retrieves, via an executed partitioned global address space (PGAS) programming language compiler, PGAS source code. At block 304, the process 300 identifies within the PGAS source code at least one shared memory array access indexed by an affine expression that comprises a distinct thread identifier that is constant and different for each of a plurality of program execution threads targeted to execute the PGAS source code. At block 306, the process 300 determines whether the at least one shared memory array access results in a local shared memory access by all of the plurality of program execution threads for all references to the at least one shared memory array access during execution of a compiled executable of the PGAS source code. At block 308, the process 300 generates direct memory access executable code for each of the at least one shared memory array access determined to result in the local shared memory access by all of the plurality of program execution threads for all references to the at least one shared memory array access during the execution of the compiled executable of the PGAS source code.

FIG. 4 is a flow chart of an example of an implementation of a process 400 for automated intraprocedural privatization for shared array references within Unified Parallel C (UPC) code. It should be noted that compilation processing and algorithms are complex in nature. The present description omits aspects of compilation that are not relevant to the present subject matter for brevity. It is additionally understood that while, as with the other examples above, the process 400 is directed to UPC code, a person of skill would be able to modify the process 400 to operate on and compile other PGAS languages based upon the description herein.

At decision point 402, the process 400 makes a determination as to whether a compile request has been detected, such as by a software developer instructing a compiler that executes the process 400 as a portion of its processing via a user interface of a compiler, such as the UPC compiler 216. In response to determining that a compile request has been detected, the process 400 retrieves universal parallel C (UPC) code from a code repository, such as the code repository 112, at block 404. At block 406, the process 400 begins parsing the UPC code. At block 408, the process 400 selects a code segment from the UPC source code that is being parsed.

At decision point 410, the process 400 makes a determination as to whether an array access code construct has been identified within the parsed UPC source code. In response to determining that an array access code construct has not been identified within the parsed UPC source code, the process 400 makes a determination at decision point 412 as to whether compilation has been completed. Again, it should be noted that processing for code segments other than array accesses has been omitted from the process 400 for brevity. However, it is understood that each line/segment of UPC code will be processed and compiled as appropriate for the particular line/segment of UPC code. In response to determining at decision point 412 that compilation has not been completed, the process 400 returns to block 408 and selects another source code segment.

Returning to decision point 410, in response to determining at decision point 410 that an array access code construct has been detected, the process 400 evaluates the Condition [1] expression described above for all possible accesses by all threads at block 414. At block 416, the process 400 evaluates the Condition [2] expression described above for all possible accesses by all threads. At decision point 418, the process 400 makes a determination as to whether the identified array access code segment is privatizable (i.e., the process 400 verifies whether both Condition [1] and Condition [2] are true). As described above, an array access code segment is privatizable if it results in a local memory reference for all threads for all index values applied by all threads to the array access code segment. Further, evaluation of Condition [1] and Condition [2] described above determine whether a memory reference is local for all threads for all index values applied by all threads to the array access code segment.

In response to determining that the identified array access code segment is privatizable, the process 400 generates direct memory access executable code at block 420. In response to determining that the identified array access code segment is not privatizable, the process 400 generates runtime call executable code at block 422.

The process 400 returns to decision point 412 and iterates as described above. In response to determining at decision point 412 that compilation has been completed, the process 400 builds and deploys executable code with direct memory accesses for all identified local shared memory accesses for all threads at block 424 to at least one computing device designated to execute one or more threads using the compiled executable code. The process 400 returns to decision point 402 and waits for another compilation request to be detected.

As such, the process 400 parses UPC code and identifies array access code constructs/segments. The process 400 evaluates Condition [1] and Condition [2] described above for each identified array access code constructs/segments to determine whether both Conditions are true (e.g., that all accesses by all threads for all index values are local references, which proves that Equation [A] is true). The process 400 creates executable direct access code for any array access code constructs that are proven to result in local accesses for all threads for all index values. The process 400 creates executable runtime calls for any array access code constructs that are proven not to result in local accesses for all threads for all index values. It should additionally be noted, as described above, that the Condition [1] expression and the Condition [2] expression are each independent of the distinct thread identifier "MYTHREAD." As such, the Condition [1] expression and the Condition [2] expression may be evaluated one time, rather than other forms of calculations that would require processing the "MYTHREAD" variable for all values of "MYTHREAD."

As described above in association with FIG. 1 through FIG. 4, the example systems and processes provide automated intraprocedural privatization for shared array references within partitioned global address space (PGAS) languages. Many other variations and additional activities associated with automated intraprocedural privatization for shared array references within partitioned global address space (PGAS) languages are possible and all are considered within the scope of the present subject matter.

The automated intraprocedural privatization for shared array references within partitioned global address space (PGAS) languages may be utilized to identify local memory accesses to shared arrays for all threads that will execute code that accesses the respective shared arrays. The subject matter described herein operates independent of (e.g., without) analysis of loop induction variables. As such, the present subject matter may be applied to shared array references regardless of whether they are inside a loop construct or outside of a loop construct. The present subject matter targets shared array references that are indexed by an affine expression of the "MYTHREAD" induction variable (e.g., a reference that represents a constant that is defined and that is different for each thread), and does not rely upon a loop induction variable. The present subject matter operates upon the recognition and analysis of shared array accesses with the objective of classifying such accesses into two sets. The first set includes local shared accesses and the second set includes remote shared accesses. The present subject matter performs this classification by analyzing candidate shared arrays for each access index (where the index expression is an affine expression of the "MYTHREAD" identifier). Further, the present subject matter operates without intervention of and independent of (e.g., without) code reduction operations. In contrast, algebraic properties of integer functions, such as "ceiling( )" and "floor ( )," are used, which improves analysis and compilation for shared array accesses. It is further noted, that while the present subject matter targets shared array references that are indexed by an affine expression of the "MYTHREAD" induction variable, the present subject matter operates to analyze shared array accesses independently of (e.g., without) the "MYTHREAD" induction variable and without requiring a calculation for each possible thread within a production environment. As such, efficiency may be further improved by reducing analysis time for shared array accesses by the use of algebraic manipulations rather than processing of complex data sets that represent array accesses for all possible threads and per-thread determinations of all possible combinations of indexing.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

retrieving, via an executed partitioned global address space (PGAS) programming language compiler, PGAS source code;

identifying within the PGAS source code at least one shared memory array access indexed by an affine expression that comprises a distinct thread identifier that is constant and different for each of a plurality of program execution threads targeted to execute the PGAS source code;

determining whether the at least one shared memory array access results in a local shared memory access by all of the plurality of program execution threads for all references to the at least one shared memory array access during execution of a compiled executable of the PGAS source code;

where the determining comprises:
performing two condition expressions that are each independent of the distinct thread identifier, the two condition expressions comprising:
a first condition expression comprising:

$$\text{floor}(k2/BF)=\text{floor}(k2/(BF*\text{THREADS}))*\text{THREADS};$$
and a second condition expression comprising:

$$\text{floor}((k1*(\text{THREADS}-1)+k2\% \ BF)/BF)=\text{THREADS}-1;$$

where the element k1 represents a first non-negative integer constant value of the affine expression that indexes the at least one shared memory array access within the retrieved PGAS source code, the element k2 represents a second integer constant value of the affine expression that indexes the at least one shared memory array access within the retrieved PGAS source code, the element BF comprises a positive constant value that represents a block factor identifying an array memory allocation quantity for each thread, and the element THREADS represents a constant that identifies a number of the plurality of program execution threads; and
verifying that the two condition expressions are true; and
further comprising generating direct memory access executable code for each of the at least one shared memory array access determined to result in the local shared memory access by all of the plurality of program execution threads for all references to the at least one shared memory array access during the execution of the compiled executable of the PGAS source code.

2. The method of claim 1, further comprising generating runtime call executable code for each of the at least one shared memory array access that will not result in the local shared memory access by all of the plurality of program execution threads for all references to the at least one shared memory array access during the execution of the compiled executable of the PGAS source code.

3. The method of claim 2, further comprising:
compiling the PGAS source code into a code build that comprises the direct memory access executable code generated for each of the at least one shared memory array access determined to result in the local shared memory access by all of the plurality of program execution threads; and
deploying the code build to at least one computing device designated to execute the plurality of program execution threads.

4. The method of claim 1, where the PGAS source code comprises Unified Parallel C (UPC) source code and the distinct thread identifier comprises a MYTHREAD identifier.

5. The method of claim 1, where:
the at least one shared memory array access comprises an access to a shared memory location inside of a code processing loop; and
determining whether the at least one share memory array access results in the local shared memory access by all of the plurality of program execution threads for all references to the at least one shared memory array access during execution of the compiled executable of the PGAS source code comprises determining whether the at least one shared memory array access results in the local shared memory access by all of the plurality of program execution threads for all references to the at least one shared memory array access independently of a loop induction variable that controls execution of the code processing loop.

6. A system, comprising:
a memory; and
a processor programmed to:
retrieve partitioned global address space (PGAS) programming language source code from the memory;
identify within the PGAS source code at least one shared memory array access indexed by an affine expression that comprises a distinct thread identifier that is constant and different for each of a plurality of program execution threads targeted to execute the PGAS source code;
determine whether the at least one shared memory array access results in a local shared memory access by all of the plurality of program execution threads for all references to the at least one shared memory array access during execution of a compiled executable of the PGAS source code;
where, in being programmed to determine, the processor is programmed to:
perform two condition expressions that are each independent of the distinct thread identifier, the two condition expressions comprising:
a first condition expression comprising:

$$\text{floor}(k2/BF)=\text{floor}(k2/(BF*\text{THREADS}))*\text{THREADS};$$
and a second condition expression comprising:

$$\text{floor}((k1*(\text{THREADS}-1)+k2\% \ BF)/BF)=\text{THREADS}-1;$$

where the element k1 represents a first non-negative integer constant value of the affine expression that indexes the at least one shared memory array access within the retrieved PGAS source code, the element k2 represents a second integer constant value of the affine expression that indexes the at least one shared memory array access within the retrieved PGAS source code, the element BF comprises a positive constant value that represents a block factor identifying an array memory allocation quantity for each thread, and the element THREADS represents a constant that identifies a number of the plurality of program execution threads; and
verify that the two condition expressions are true; and
where the processor is further programmed to generate direct memory access executable code for each of the at least one shared memory array access determined to result in the local shared memory access by all of the plurality of program execution threads for all references to the at least one shared memory array access during the execution of the compiled executable of the PGAS source code.

7. The system of claim 6, where the processor is further programmed to generate runtime call executable code for each of the at least one shared memory array access that will not result in the local shared memory access by all of the plurality of program execution threads for all references to the at least one shared memory array access during the execution of the compiled executable of the PGAS source code.

8. The system of claim 7, where the processor is further programmed to:
compile the PGAS source code into a code build that comprises the direct memory access executable code generated for each of the at least one shared memory array access determined to result in the local shared memory access by all of the plurality of program execution threads; and deploy the code build to at least one computing device designated to execute the plurality of program execution threads.

9. The system of claim 6, where the PGAS source code comprises Unified Parallel C (UPC) source code and the distinct thread identifier comprises a MYTHREAD identifier.

10. The system of claim 6, where:
the at least one shared memory array access comprises an access to a shared memory location inside of a code processing loop; and
in being programmed to determine whether the at least one share memory array access results in the local shared memory access by all of the plurality of program execution threads for all references to the at least one shared memory array access during execution of the compiled executable of the PGAS source code, the processor is programmed to determine whether the at least one shared memory array access results in the local shared memory access by all of the plurality of program execution threads for all references to the at least one shared memory array access independently of a loop induction variable that controls execution of the code processing loop.

11. A computer program product comprising a computer readable storage memory including computer readable program code, where the computer readable program code when executed on a computer causes the computer to:
retrieve partitioned global address space (PGAS) programming language source code;
identify within the PGAS source code at least one shared memory array access indexed by an affine expression that comprises a distinct thread identifier that is constant and different for each of a plurality of program execution threads targeted to execute the PGAS source code;
determine whether the at least one shared memory array access results in a local shared memory access by all of the plurality of program execution threads for all references to the at least one shared memory array access during execution of a compiled executable of the PGAS source code;
where, in causing the computer to determine, the computer readable program code when executed on the computer causes the computer to:
perform two condition expressions that are each independent of the distinct thread identifier, the two condition expressions comprising:
a first condition expression comprising:

floor($k2/BF$)=floor($k2/(BF*$THREADS))*THREADS; and a second condition expression comprising:

floor(($k1*$(THREADS-1)+$k2$% $BF$)/$BF$)=THREADS-1;

where the element k1 represents a first non-negative integer constant value of the affine expression that indexes the at least one shared memory array access within the retrieved PGAS source code, the element k2 represents a second integer constant value of the affine expression that indexes the at least one shared memory array access within the retrieved PGAS source code, the element BF comprises a positive constant value that represents a block factor identifying an array memory allocation quantity for each thread, and the element THREADS represents a constant that identifies a number of the plurality of program execution threads; and verify that the two condition expressions are true; and
the computer readable program code when executed on the computer further causes the computer to generate direct memory access executable code for each of the at least one shared memory array access determined to result in the local shared memory access by all of the plurality of program execution threads for all references to the at least one shared memory array access during the execution of the compiled executable of the PGAS source code.

12. The computer program product of claim 11, where the computer readable program code when executed on the computer further causes the computer to generate runtime call executable code for each of the at least one shared memory array access that will not result in the local shared memory access by all of the plurality of program execution threads for all references to the at least one shared memory array access during the execution of the compiled executable of the PGAS source code.

13. The computer program product of claim 12, where the computer readable program code when executed on the computer further causes the computer to:
compile the PGAS source code into a code build that comprises the direct memory access executable code generated for each of the at least one shared memory array access determined to result in the local shared memory access by all of the plurality of program execution threads; and
deploy the code build to at least one computing device designated to execute the plurality of program execution threads.

14. The computer program product of claim 11, where the PGAS source code comprises Unified Parallel C (UPC) source code and the distinct thread identifier comprises a MYTHREAD identifier.

15. The computer program product of claim 11, where:
the at least one shared memory array access comprises an access to a shared memory location inside of a code processing loop; and
in causing the computer to determine whether the at least one share memory array access results in the local shared memory access by all of the plurality of program execution threads for all references to the at least one shared memory array access during execution of the compiled executable of the PGAS source code, the computer readable program code when executed on the computer causes the computer to determine whether the at least one shared memory array access results in the local shared memory access by all of the plurality of program execution threads for all references to the at least one shared memory array access independently of a loop induction variable that controls execution of the code processing loop.

* * * * *